Jan. 26, 1926. 1,570,691
L. A. MAPEL
INDICATING INSTRUMENT
Filed March 1, 1920 2 Sheets-Sheet 1
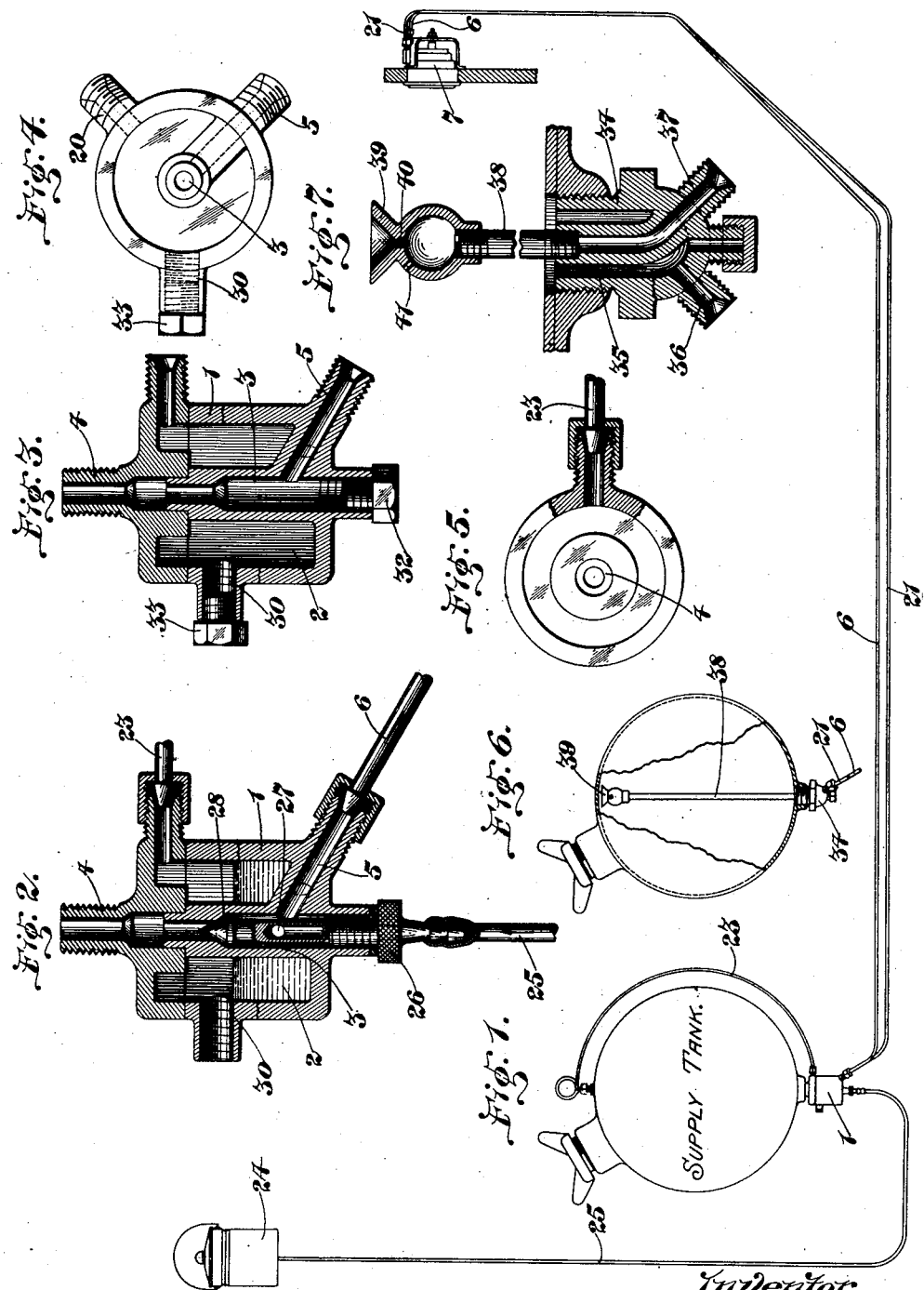

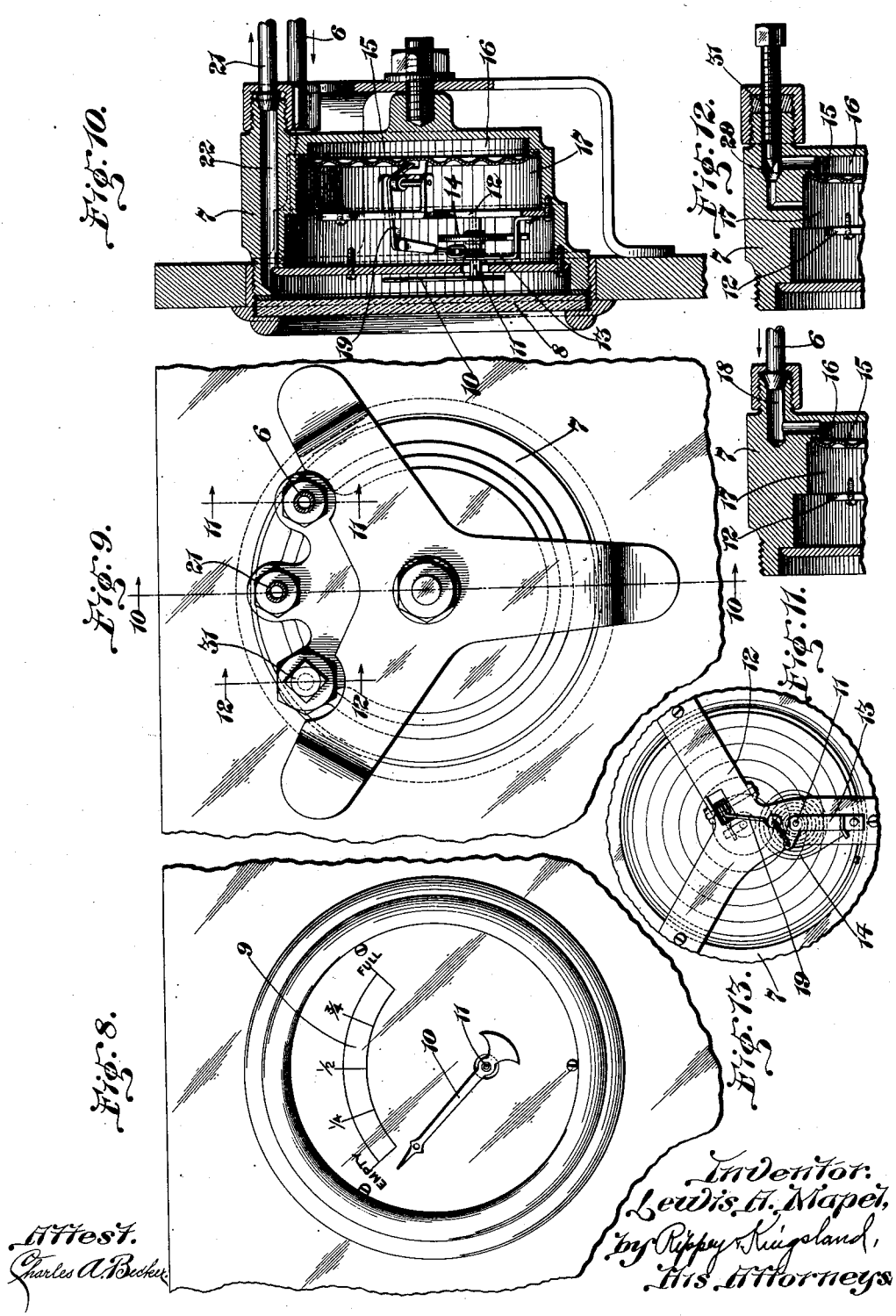

Patented Jan. 26, 1926.

1,570,691

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

INDICATING INSTRUMENT.

Application filed March 1, 1920. Serial No. 362,573.

*To all whom it may concern:*

Be it known that I, LEWIS A. MAPEL, a citizen of the United States, residing at the city of St. Louis, and State of Missouri, have invented a new and useful Indicating Instrument, of which the following is a specification.

This invention relates to devices for indicating the approximate volume or quantity of gasoline or other liquid contained in the supply tank of an automobile or other vehicle or vessel.

My invention comprises a device which is especially adapted for use on automobiles, or other vehicles, or on vessels, to indicate constantly to the operator or observer the approximate quantity or volume of liquid remaining in the supply tank irrespective of variations in the level or position of the vehicle or vessel, and irrespective of whether the vehicle or vessel is in motion or stationary. It is well known that vehicles such as automobiles and the like, and vessels such as boats, ships, or airplanes and the like, when travelling are subject to frequent variation in their position or level with reference to the normal horizontal axis thereof. In the case of automobiles and the like there are constant variations in the level or angles of inclination of the streets and roads over which the vehicles travel; and also in the case of boats and ships there is frequent variation in the positions thereof, due to the water waves or other conditions; and these variations of position also apply to airplanes particularly when the airplane is rising or landing, and also when the airplane rises and descends during flight. My device is specially adapted for use in connection with all such vehicles of transportation whether on land, on, or under the water, or in the air and, as will hereinafter appear, the device may be used with equal efficiency in connection with stationary engines or mechanisms. I do not restrict myself to use of the invention in connection with either moving or stationary mechanisms, nor in other unessential particulars, as I contemplate using the invention wherever satisfactory use thereof may be made.

An object of the invention is to provide a device which may be readily embodied as a part of the equipment of any vehicle, machine or apparatus with which it may be advantageously used and which will afford a constant visual indication of the approximate volume or quantity of liquid, whether in the form of gasoline, oil or water remaining available for use at the source of supply with which the device is in communication.

Another object of the invention is to provide a device of the character and for the purpose mentioned which will not be affected by the variations of the horizontal axis of the vehicle, vessel or machine from the normal horizontal position; but which will continue, irrespective of such variations, to afford approximately accurate and definite indication of the volume or quantity of liquid remaining unconsumed at the source of supply.

Another object of the invention is to provide a device of the character and for the purpose mentioned which will not be affected by the variations in temperature, whether such variations are climatic variations or are artificial, except in the case of the most extreme cold at which the liquid might become frozen or congealed, or in the case of extreme heat under which the liquid might become vaporized.

My improved device is constructed and designed so that it will function properly to give the desired indication whether mounted near the source of liquid supply or at a point remote from the source of supply.

Various other objects and advantages and uses of the invention are contemplated and will be apparent from the following description in which I make reference to the drawings showing one satisfactory embodiment of the invention, and in which—

Fig. 1 is a view illustrating the general arrangement of the device when applied to an automobile to indicate the approximate quantity or volume of gasoline in the supply tank, the indicating device being located on the dash.

Fig. 2 is a vertical sectional view of a tank fitting used in connection with my invention, showing a passage in connection therewith for filling the device to complete the installation thereof.

Fig. 3 is a similar sectional view of the tank fitting detached from the filling passage.

Fig. 4 is a plan view of the lower part of the fitting.

Fig. 5 is a view looking toward the lower end of the top portion of the fitting detached from the lower portion of the fitting.

Fig. 6 is a view illustrating a modified form of fitting applied to the liquid supply tank.

Fig. 7 is an enlarged sectional view of the modified form of fitting.

Fig. 8 is a view showing the face of the indicating device on the dash of an automobile or other support.

Fig. 9 is a view showing the opposite end of the device, the passages leading thereto being shown in section.

Fig. 10 is a vertical sectional view on the line 10—10 of Fig. 9.

Fig. 11 is a vertical sectional view of a portion of the device on the line 11—11 of Fig. 9, showing specially the inlet passage to the rear compartment of the indicating device.

Fig. 12 is a sectional view on the line 12—12 of Fig. 9, showing specially the passage for permitting flow of the liquid from the rear compartment to the front compartment, and the valve controlling said passage.

Fig. 13 shows a portion of the mechanism for operating the indicating pointer under control of the diaphragm of the instrument.

As shown the indicating device is supported in a position convenient for observation so as to afford constant indication of the approximate quantity or volume of liquid contained in the supply tank, and variations in the quantity and volume of the liquid. For convenience of illustration I have shown the device applied to the dash of an automobile and connected with the supply tank, although it will be understood that I do not in any respect limit myself to any particular or specific use of the invention.

The connection from the indicating device to the supply tank comprises a fitting in the form of a casing having a chamber therein and also having a passage therethrough. The indicating device is divided into compartments having passages leading from said compartments respectively to the chamber and the passages respectively in the fitting, and includes indicating mechanism for indicating the quantity or volume of liquid in the tank to which the fitting is applied. In the embodiment shown the fitting comprises a casing 1 formed with a chamber 2 therein and with a passage 3 extending entirely across the vertical length of the chamber for communication with the tank. A projection 4 on the upper end of the fitting constitutes means for connection with the tank and has a passage for admitting liquid from the tank into the passage 3.

An outlet opening 5 from the passage 3 is in communication with a pipe or passage 6 leading to the rear compartment of the indicating device, so that after the instrument of which the present invention constitutes a part has been applied and filled with liquid the indicating device will be affected by variation in the quantity or volume of liquid contained in the tank to afford constant indication of the volume or quantity of liquid remaining in the tank.

The indicating device is more completely shown in Figs. 8 to 12 inclusive and comprises a casing 7 having a transparent front wall 8 through which the dial 9 and pointer 10 may be observed. The pointer 10 is attached to a spindle 11 supported for free rotation by a bracket 12 within the casing 7 and an arm 13 attached to the bracket. A spring 14 is connected to the spindle 11 to eliminate lost motion in the indicating mechanism. A diaphragm 15 within the casing 7 divides the casing into a compartment 16 and a compartment 17. The pipe 6 opens through an appropriate passage 18 (Fig. 11) in order to admit liquid into one of said compartments from the supply tank. Appropriate lever and link connections 19 are provided between the spindle 11 and the diaphragm 15, whereby the spindle and thereby the pointer 10 will be caused to respond and to assume positions relative to the dial 9 corresponding to or commensurate with the quantity or volume of liquid contained or remaining in the supply tank. This result, however, is accomplished only because both of the compartments 16 and 17 are kept filled with liquid, but from different sources of supply.

The chamber 2, which is out of communication with the passages 3 and 5, constitutes a liquid receptacle and has an outlet passage 20 in connection with a pipe 21 communicating with a passage 22 in the casing (Fig. 10) opening into the compartment 17. A passage 23 from the liquid supply tank, above the level of the liquid therein, opens into the chamber 2 above the level of the liquid in said chamber.

When the installation of the instrument of which this invention is a part, is complete the compartments 16 and 17 (Fig. 10) are out of communication with each other, except in an indirect way through the supply tank and thence through the passage 23, the receptacle 2 and the passage 21.

It is obvious from the foregoing that the instrument is to conform with the character of the liquid to be measured, also that the scale on the dial between "Empty" and "Full," (Fig. 8) over which the indicator travels, can be graduated to read "Altitude feet" or "Contents gallons," or fractional parts thereof, the same being computed from the capacity and dimensions of the tank.

The method by which the device functions and operates is more clearly comprehended by including a consideration of the manner and equipment by which the entire instrument is installed and placed in condition for use. The drawings show such equipment which I will now proceed to describe.

After the device has been mounted and connected in the manner above described, liquid is supplied to the device through the passages 3, 5, 6 and 18 until the casing 7 is completely filled with the liquid so as to exclude all air therefrom, as well as from the passages connecting the casing 7 with the fitting 1. The exclusion of the air places the device entirely under the control of the liquid so that the position of the pointer 10 will be determined entirely by the quantity or volume of liquid contained in the supply tank, free from other influences. Liquid may be supplied to fill the device in any desired way, as from a supply vessel 24 through the passage 25 communicating with an opening through a member 26 releasably secured within the passage 3 and having discharge outlets 27 through which the liquid is discharged into the passage 3 and thence to the indicating device through the passage connecting the fitting 1 with said device. The member 26 includes a valve portion 28 which by contact with an appropriate valve seat in the passage 3 closes communication with the tank while the device is being filled.

Reference is now made to Fig. 12 in which it will be seen that the casing 7 includes a passage 29 by which communication may be effected between the compartments 16 and 17. The compartment with which the pipe 6 is connected becomes first filled with liquid and, as the flow of liquid continues, it flows through the passage 29 into the other compartment and continues until both compartments become filled. As the first compartment is filled the air is forced therefrom through the passage 29 into the other compartment; and as the other compartment becomes filled the air is forced therefrom through the passage 29 and thence through the passage 21 leading to the fitting 1. The flow of the liquid is continued until the compartments 16 and 17 are completely filled and until the liquid flows through the passages 22 and 21 to the fitting 1. The liquid which flows to the fitting 1 enters the chamber 2 in the fitting and rises in said chamber 2 until the liquid overflows through an overflow opening 30 (Figs. 2 and 3). The overflow of the liquid through the opening 30 affords an indication that the instrument is filled.

Next, the valve 31 (Fig. 12) is closed in order to close permanently communication between the compartments 16 and 17. Then the equipment for filling the instrument is detached by removing the part 26 and closing the lower end of the passage 3 by a closure 32 (Fig. 3). Also, the overflow opening 30 is closed by a closure 33.

After the instrument has been filled, as above described or otherwise, and the equipment for filling the instrument has been detached and the other described adjustments have been made, the instrument is ready for use and the supply tank may be filled. The pressure of the liquid in the supply tank, which liquid also completely fills the passage 3, is imparted to the liquid column in the passage communicating with the compartment in the indicating device, and thereby to the liquid in that compartment and against the diaphragm 15. Thus, the diaphragm 15 is caused to control the pointer 10 which assumes a position relative to the dial 9 indicating the approximate quantity or volume of liquid within the supply tank. As the quantity or volume of liquid within the supply tank varies the pressure against the diaphragm 15 also varies, thereby causing the pointer 10 to respond to such variation and to indicate constantly the approximate quantity or volume of liquid contained in the supply tank. The instrument functions to afford approximately accurate indications of the quantity or volume of liquid contained in the supply tank, whether the liquid is under pressure, or otherwise. The dial is so arranged that when the pointer registers at "Empty" a limited supply of liquid still remains in the tank, thus indicating to the operator that the supply of liquid should be replenished, and this indication is afforded as an emergency feature so that the supply may be replenished before it is completely exhausted.

Figs. 6 and 7 show one alternative form of fitting including an alternative form of communication from the fitting to the supply tank, above the level of the liquid in the supply tank. The fitting shown in Figs. 6 and 7 comprises a casing 34 having a chamber 35 therein opening into the supply tank so as to receive the pressure of the liquid in the supply tank upon the column of liquid leading to the indicating device in approximately the same way that the pressure of the liquid in the supply tank is received upon the column of liquid leading to the device through the passage 3 in the form previously described. As shown in Fig. 7, the fitting is provided with means 36 for connection with a passage, such as the passage 6, leading to the instrument. Also, the fitting shown in Fig. 7 is provided with a passage 37 for connection with a passage such as the passage 21 communicating with the indicating device. Communication from the casing 34 to the supply tank, above the level of the liquid in the supply tank, comprises a pipe 38 opening into the passage 37 and equipped on its upper end, above the level of the liquid in the supply tank, with a hopper 39 having an opening 40 through the bottom thereof. The hopper 39 receives splashes of liquid, caused as an incident to travel of the vehicle or vessel, and discharges small quantities of liquid through the opening 40 into the pipe 38 to replace the liquid which may evaporate from or otherwise leave the pipe 38 or the passage 37. A vent 41 is provided below the passage 40 for the discharge of air which might otherwise prevent flow of the liquid from the hopper into the pipe 38.

From the foregoing it will be apparent that the pipe 38 functions as does the pipe 23 to equalize the pressure above the liquid in the fitting with the pressure above the liquid in the tank, irrespective of any variations of such pressure. As the air above the liquid in the tank becomes saturated with the vapor of the liquid therein, and being in communication with the fitting above the liquid therein, evaporation of the liquid in the fitting is prevented. This is because it is desirable that the level of the liquid be maintained approximately uniform at all times in the fitting in order to obtain the best results.

The device may be used with satisfaction to indicate the pressure of any liquids or semi-fluid substances, and it is not necessary that the instrument be filled with the same character of liquid that is contained in the supply tank. It is only necessary that the device be filled with some transparent liquid through which the dial and the pointer may be observed as they are both immersed in or covered by the liquid which is on both sides of the dial support.

In accordance with this invention the casing is provided with an imperforate diaphragm which divides the same into two liquid receiving compartments and an indicator is connected for operation by the diaphragm. Each compartment has thereto pipe connections 6 and 21, which pipe connections are adapted to supply thereto and maintain therein the pressure transmitting liquid. The two compartments are, however, connected by a port which is controlled by a valve so that in filling the device, liquid from one of the pipe connections is arranged to flow into the compartment and therefrom into the other compartment in order to fill both compartments. The connections to the compartments and the port controlled by the valve are so arranged as to permit displacement of the air in the compartments, while they are being filled so that when the instrument is filled, air will be excluded from both compartments, especially since the pipe connections 6 and 21 are capillary tubes.

From the foregoing it is apparent that my invention completely serves its objects. It is adapted for many uses, only a few of which I have attempted to mention, and it may be varied in numerous respects without departing from the nature and principle of the invention. In describing a preferred embodiment of the invention I do not restrict myself to any specific or unessential particulars, nor do I exclude variations in the form or construction or arrangement of the invention that are within the scope of the appended claims.

What I claim and desire to secure by Letters Patent, is:—

1. A pressure gage comprising, a casing, an imperforate diaphragm mounted within said casing and dividing the same into two liquid-receiving compartments, an indicator connected for operation by said diaphragm, a pipe connection to each compartment adapted to supply thereto and maintain therein the pressure-transmitting liquid, and means for connecting said compartments, adapted to permit the liquid from one of said connections to flow into its compartment and therefrom into the other compartment, in order to fill both compartments, said connections being arranged to permit displacement of the air in said compartments while they are being filled.

2. A pressure gage comprising, a casing, an imperforate diaphragm mounted within said casing and dividing the same into two liquid-receiving compartments, an indicator connected for operation by said diaphragm, a pipe connection to each compartment adapted to supply thereto and maintain therein the pressure-transmitting liquid, a port connecting said compartments for direct communication therebetween independently of said connections, and a valve adapted to open said port while said connections are left open to said chambers.

3. A pressure gage comprising, a casing, an imperforate diaphragm mounted within said casing and dividing the same into two liquid-receiving compartments, an indicator connected for operation by said diaphragm, a pipe connection to each compartment adapted to supply thereto and maintain therein the pressure-transmitting liquid, a port connecting said compartments for direct communication therebetween independently of said connections, and a valve adapted to open said port when the compartments are being filled and adapted to close said port when the compartments are filled.

4. A pressure gage comprising, a casing, an imperforate diaphragm mounted within said casing and dividing the same into two liquid-receiving compartments, an indicator connected for operation by said diaphragm, a pipe connection to each compartment adapted to supply thereto and maintain therein the pressure-transmitting liquid, a port connecting said compartments at the tops thereof for direct communication therebetween independently of said connections, and a valve for said port.

5. A pressure gage comprising, a casing, an imperforate diaphragm mounted within said casing and dividing the same into two liquid-receiving compartments, an indicator connected for operation by said diaphragm, a pipe connection to the top of each compartment adapted to supply thereto and maintain therein the pressure-transmitting liquid, a port connecting said compartments at the tops thereof, and a valve for said port.

LEWIS A. MAPEL.